M. McBARREN.
RUBBER ATTACHMENT FOR HORSESHOES TO PREVENT INTERFERING,&c.

No. 188,808. Patented March 27, 1877.

WITNESSES:
N. C. Lombard.
E. A. Hemmenway.

INVENTOR:
Michael McBarren

UNITED STATES PATENT OFFICE.

MICHAEL McBARREN, OF BOSTON, MASSACHUSETTS.

IMPROVEMENT IN RUBBER ATTACHMENTS FOR HORSESHOES TO PREVENT INTERFERING, &c.

Specification forming part of Letters Patent No. 188,808, dated March 27, 1877; application filed February 17, 1877.

*To all whom it may concern:*

Be it known that I, MICHAEL McBARREN, of Boston, in the county of Suffolk and State of Massachusetts, have invented a new and useful Device for Preventing Overreaching and Interfering in Horses, of which the following, taken in connection with the accompanying drawings, is a specification:

My invention relates to a device to be secured to a horse's hoof, to prevent injury to his feet by overreaching or interfering; and it consists in the use of a rubber cushion or pad extending around, or partially around, the base of the hoof and the outer edge of the shoe, and projecting outwardly therefrom a short distance, and secured firmly to the horse's foot by being clamped between the metal shoe and the hoof, as will be further described.

Figure 1:
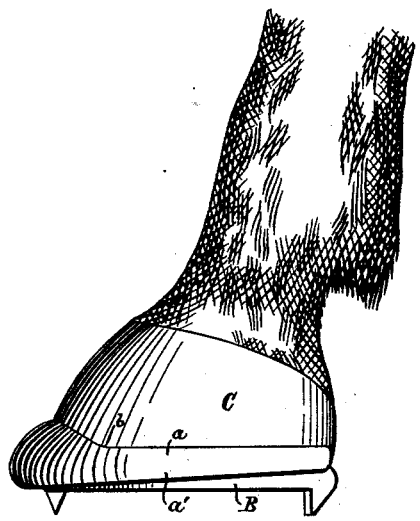
Figure 2:
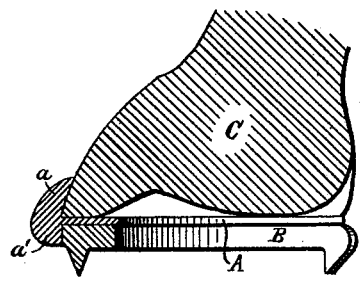
Figure 3:
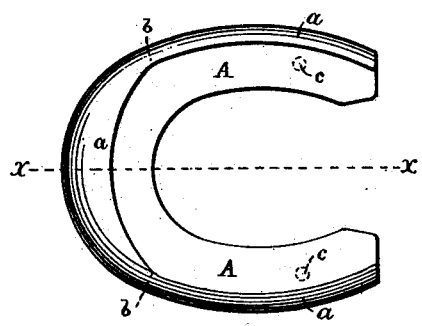
Figure 4:
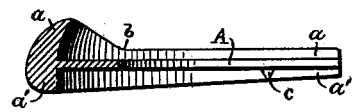

Figure 1 of the drawings is a side elevation of a horse's foot with my invention applied thereto. Fig. 2 is a vertical section of the same, illustrating the manner of applying it to the foot. Fig. 3 is a plan of my device removed from the foot, and Fig. 4 is a vertical section on line $x\ x$ on Fig. 3.

A is a thin web of rubber, having an outline, as seen in plan, corresponding to the shape of the base of the horse's hoof, but somewhat larger across, so that when secured to the hoof by nailing the metal shoe B thereto through said web, as shown in Fig. 2, it will project beyond the edge of the shoe B and the hoof C. Around the outer edge of the web A extend the ribs $a$ and $a'$, projecting, one upward and the other downward therefrom, so as to fit around and partially inclose the outer edge of the metal shoe and the base of the hoof, as shown in Fig. 2. These ribs $a$ and $a'$ are thickened up at the toe of the foot, so as to form a thick cushion of elastic material, as shown, and the outer edge of the whole is rounded over, so as to present no sharp corners. This cushion of soft rubber, molded in one piece, is placed upon the bottom of the horse's foot, with the web A resting flat thereon, and the rib $a$ fitting closely around the base of the hoof, and the metal shoe B is placed in position, resting upon the web A and within the rib $a'$, and nailed to the hoof in the usual manner, the nails passing through the rib A in an obvious manner.

Overreaching and interfering are two sources of serious trouble to owners of horses, and many devices have been tried to obviate or remedy the difficulty with only partial success. Horses given to overreaching very often cut their fore legs or feet by striking them with the calk of the hind shoe so seriously as to disable them for active service for some time, and in other cases the toe of the hind foot comes in contact with the shoe on the forward foot; a constant repetition of such contact soon wears the toe of the hind hoof away till it becomes so tender and sore as to necessitate dispensing with the services of the horse until the hoofs can have time to grow and become sound and tough again. This difficulty is entirely overcome by the use of my elastic cushion, upon which the blow is received, thereby preventing the shoe on one foot coming in contact with the other foot or leg, and, as a consequence of the blow being struck with the soft-rubber cushion instead of the iron or steel shoe, as heretofore, serious injury to either of the feet of the horse is entirely avoided.

For preventing injurious effects from the overreaching of horses it is only necessary to place the cushions on the hind feet of the horse, and if the same horse is not given to interfering the cushion need not extend back around the sides of the foot beyond the points marked $b\ b$. But for horses given to interfering, the cushions should be made of the full length, as seen in Figs. 1, 3, and 4, and placed upon either the fore or hind feet, or both, according to the requirements of the particular case in hand, the projecting rounded edges of the soft-rubber cushions effectually preventing the edge of the metal shoe from coming in contact with the fetlock-joint of the opposite foot, in an obvious manner.

On the under side of the web A, and near its rear end, are formed the downwardly-projecting teats $c\ c$, as shown in full in Fig. 4 and in dotted lines in Fig. 3, said teats being designed to fit into correspondingly-shaped recesses formed in the upper surface of the shoe, to assist in holding the cushion in place in cases where the shoe is nailed to the hoof only near the toe, as is necessary on the inside of an interfering horse's foot.

What I claim as new, and desire to secure by Letters Patent of the United States, is—

An elastic cushion shaped to conform to and partially inclose and surround the base of a horse's hoof and the shoe attached thereto, by means of the overlapping portions $a$ or $a'$, and adapted to be secured to the foot by being clamped between the shoe and hoof, as herein set forth, as a new article of manufacture.

Executed at Boston, Massachusetts, this 13th day of February, A. D. 1877.

MICHAEL McBARREN.

Witnesses:
N. C. LOMBARD,
E. A. HEMMENWAY.